US006850244B2

(12) United States Patent
Munshi et al.

(10) Patent No.: US 6,850,244 B2
(45) Date of Patent: Feb. 1, 2005

(54) APPARATUS AND METHOD FOR GRADIENT MAPPING IN A GRAPHICS PROCESSING SYSTEM

(75) Inventors: Aaftab Munshi, Los Gatos, CA (US); Colin Sharp, San Jose, CA (US)

(73) Assignee: Micron Techology, Inc., Boise, ID (US)

( * ) Notice: Subject to any disclaimer, the term of this patent is extended or adjusted under 35 U.S.C. 154(b) by 616 days.

(21) Appl. No.: 09/759,789

(22) Filed: Jan. 11, 2001

(65) Prior Publication Data

US 2002/0089511 A1 Jul. 11, 2002

(51) Int. Cl.[7] .............................................. G06T 15/00
(52) U.S. Cl. ...................................................... 345/584
(58) Field of Search ......................................... 345/584

(56) References Cited

U.S. PATENT DOCUMENTS 5,739,818 A 4/1998 Spackman .................. 345/425
5,786,822 A 7/1998 Sakaibara et al. .......... 345/430
5,808,619 A 9/1998 Choi et al. .................. 345/426
5,880,736 A 3/1999 Peercy et al. ............... 345/426
5,949,424 A 9/1999 Cabral et al. ............... 345/426
6,175,368 B1 * 1/2001 Aleksic et al. .............. 345/582
6,654,013 B1 11/2003 Malzbender et al. ........ 345/426

OTHER PUBLICATIONS

Blinn, J.F. "Simulation of Wrinkled Surfaces", Aug. 1978, pp. 286–292.*
Learning Alias Level One, 1995, pp. 205–206.*
Foley et al., Computer Graphics: Principles and Practice, 1997, pp. 738.*
Blinn, J. F. "Simulation of Wrinkled Surfaces", Caltech/JPL, Computer Graphics, A Quartely Report of SIGGRAPH–ACM, vol. 12, No. 3, Aug. 1978. pp. 286–292.

* cited by examiner

*Primary Examiner*—Almis Jankus
(74) *Attorney, Agent, or Firm*—Dorsey & Whitney LLP

(57) ABSTRACT

A method and system for providing surface texture in a graphics image rendered by a graphics processing system. Color values of a pixel having a normal vector normal to a surface in which the pixel is located are calculated based on a perturbed normal vector. The perturbed normal vector is displaced from the normal vector by a displacement equal to the sum of a first vector tangent to the surface at the location of the pixel scaled by a first scale factor and a first displacement value, and a second vector tangent to the surface at the location of the pixel and scaled by a second scale factor and a second displacement value, the second vector perpendicular to the first vector. The displacement values are representative of partial derivatives of a function defining a texture applied to the surface and the scale factors are used to scale the magnitude of the resulting perturbed normal. The color value for the pixel being rendered will be based on the perturbed normal vector instead of the normal vector.

27 Claims, 3 Drawing Sheets

APPARATUS AND METHOD FOR GRADIENT MAPPING IN A GRAPHICS PROCESSING SYSTEM

TECHNICAL FIELD

The present invention is related generally to the field of computer graphics, and more particularly, to a circuit and method in a computer graphics processing system for producing surface detail in graphics images.

BACKGROUND OF THE INVENTION

To create realistic computer graphics images, surfaces of the graphics images should have surface detail. There are several methods that are conventionally used to create such surface details or textures. One common method of creating surface detail is to apply texture maps. Texture mapping refers to techniques for adding surface detail, or a texture map, to areas or surfaces of graphics images. A typical texture map is represented in a computer memory as a bitmap or other raster-based encoded format, and includes point elements, or "texels." Generally, the process of texture mapping occurs by accessing the texels from the memory that stores the texture data, and transferring the texture data to predetermined points of surface being texture mapped. The texture map is applied according to the orientation and perspective of the surface on which the texture is applied. After texture mapping, a version of the texture image is visible on surfaces of the graphics image with the proper perspective and shading. Thus, the resulting graphics image appears to have the surface detail of the texture map.

Texture mapping creates realistic surface details in still graphics images, however, where the image is changing and moving, as in computer animation, texture mapping is unable to maintain the same level of realism as in a still image. That is, changes in the appearance of a surface, such as surface reflections of a surface having fine surface details and unevenness, are not produced where texture mapping is applied. What usually occurs is that any changes in the appearance of the graphics image due to a perspective shift are made for the entire surface of the graphics primitive to which the texture map is applied. Thus, the realism produced by texture mapping in a still graphics image is lost when applied in computer animation.

An alternative method of creating surface detail in a graphics image is to apply bump mapping. Bump mapping is a technique used in graphics applications for simulating the effect of light reflecting from small perturbations across a surface. See, Blinn, J. F., "Simulation of Wrinkled Surfaces," Computer Graphics vol. 12 (August 1978). A bump map f(u, v) is interpreted as a height field that perturbs the surface along its normal vector at each point. However, rather than changing the surface geometry of the object to create the perturbations, only the normal vector for each pixel is modified. Thus, small surface details, represented by the individual pixels of a graphics image, can be realistically reproduced in computer animation applications. The conventional Blinn bump mapping technique computes the perturbed normal vector from the equation:

$$N' = N + f_u(P_v \times N) + f_v(P_u \times N),$$

Where N' is the perturbed normal, N is the interpolated normal, $f_u$ and $f_v$ are the partial derivatives of the image height field, and $P_u$ and $P_v$ are the tangent vectors along the u and v axes, respectively.

Although bump mapping produces graphics images having more realistic surface details than texture mapping, implementing the equation to calculate a perturbed normal in a graphics processing system can be impractical and expensive. For example, complex circuitry is necessary to implement the aforementioned equation, calculating the perturbed normal on a pixel-by-pixel basis is a slow and resource intensive process, and including a circuit capable of performing the calculations consumes precious space in a graphics processing system. In applications where high integration of a graphics processing system is desirable, or where graphics images must be rendered quickly, as in computer animation applications, including circuitry in the graphics processing system capable of carrying out conventional methods of bump mapping is likely to be an unacceptable alternative.

Therefore, there is a need for method and apparatus that can provide surface detail on graphics images rendered by a graphics processing system that can maintain an acceptable level of realism in graphics animation applications, but does not require the circuitry necessary to carry out conventional methods of bump mapping.

SUMMARY OF THE INVENTION

The present invention is directed toward a method and system for providing surface texture in a graphics image rendered by a graphics processing system. The system alters color values of a pixel having a normal vector normal to a surface in which the pixel is located by calculating the color values for the pixel based on a perturbed normal vector. The perturbed normal vector is displaced from the normal vector by a displacement equal to the sum of a first vector tangent to the surface at the location of the pixel scaled by a first scale factor and a first displacement value, and a second vector tangent to the surface at the location of the pixel and scaled by a second scale factor and a second displacement value. The second vector is perpendicular to the first vector. The first and second displacement values may be values representative of partial derivatives for a first and second variable, respectively, of a function defining a texture applied to the surface. The first and second scale factors comprise scalar values that may be unequal that are used to scale the magnitude of the resulting perturbed normal. The color value for the pixel being rendered will be based on the perturbed normal vector instead of the normal vector.

DETAILED DESCRIPTION OF THE INVENTION

Embodiments of the present invention provide a gradient mapping engine and method for creating surface detail in a graphics image rendered by a graphics processing system. The gradient mapping engine provides a perturbed normal vector for use in calculating a pixel's color value by estimating the conventional bump mapping equation previously described. Certain details are set forth below to provide a sufficient understanding of the invention. However, it will be clear to one skilled in the art that the invention may be practiced without these particular details. In other instances, well-known circuits, control signals, timing protocols, and software operations have not been shown in detail in order to avoid unnecessarily obscuring the invention.

Figure 1:
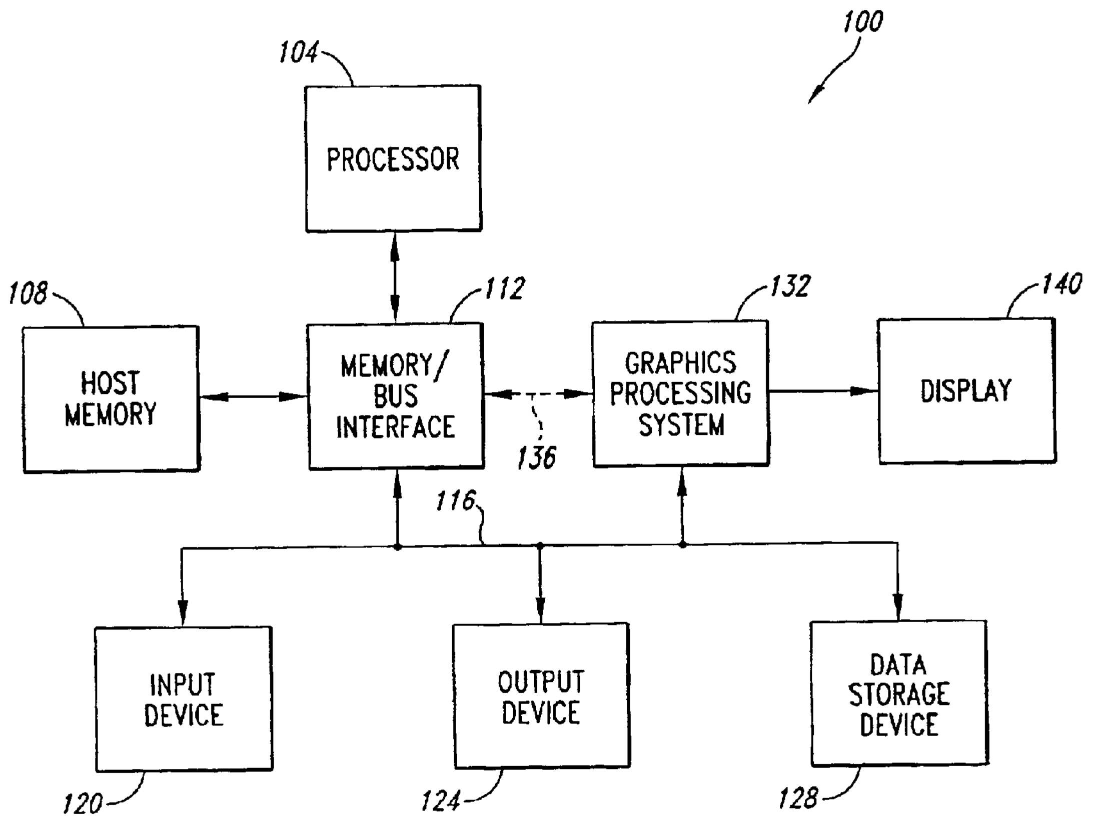
FIG. 1 a block diagram of a computer system in which embodiments of the present invention are implemented.

FIG. 1 illustrates a computer system 100 in which embodiments of the present invention are implemented. The computer system 100 includes a processor 104 coupled to a host memory 108 through a memory/bus interface 112. The memory/bus interface 112 is coupled to an expansion bus 116, such as an industry standard architecture (ISA) bus or a peripheral component interconnect (PCI) bus. The computer system 100 also includes one or more input devices 120, such as a keypad or a mouse, coupled to the processor 104 through the expansion bus 116 and the memory/bus interface 112. The input devices 120 allow an operator or an electronic device to input data to the computer system 100. One or more output devices 120 are coupled to the processor 104 to provide output data generated by the processor 104. The output devices 124 are coupled to the processor 104 through the expansion bus 116 and memory/bus interface 112. Examples of output devices 124 include printers and a sound card driving audio speakers. One or more data storage devices 128 are coupled to the processor 104 through the memory/bus interface 112 and the expansion bus 116 to store data in, or retrieve data from, storage media (not shown). Examples of storage devices 128 and storage media include fixed disk drives, floppy disk drives, tape cassettes and compact-disc read-only memory drives.

The computer system 100 further includes a graphics processing system 132 coupled to the processor 104 through the expansion bus 116 and memory/bus interface 112. Optionally, the graphics processing system 132 may be coupled to the processor 104 and the host memory 108 through other types of architectures. For example, the graphics processing system 132 may be coupled through the memory/bus interface 112 and a high speed bus 136, such as an accelerated graphics port (AGP), to provide the graphics processing system 132 with direct memory access (DMA) to the host memory 108. That is, the high speed bus 136 and memory bus interface 112 allow the graphics processing system 132 to read and write host memory 108 without the intervention of the processor 104. Thus, data may be transferred to, and from, the host memory 108 at transfer rates much greater than over the expansion bus 116. A display 140 is coupled to the graphics processing system 132 to display graphics images. The display 140 may be any type of display, such as a cathode ray tube (CRT), a field emission display (FED), a liquid crystal display (LCD), or the like, which are commonly used for desktop computers, portable computers, and workstation or server applications.

Figure 2:
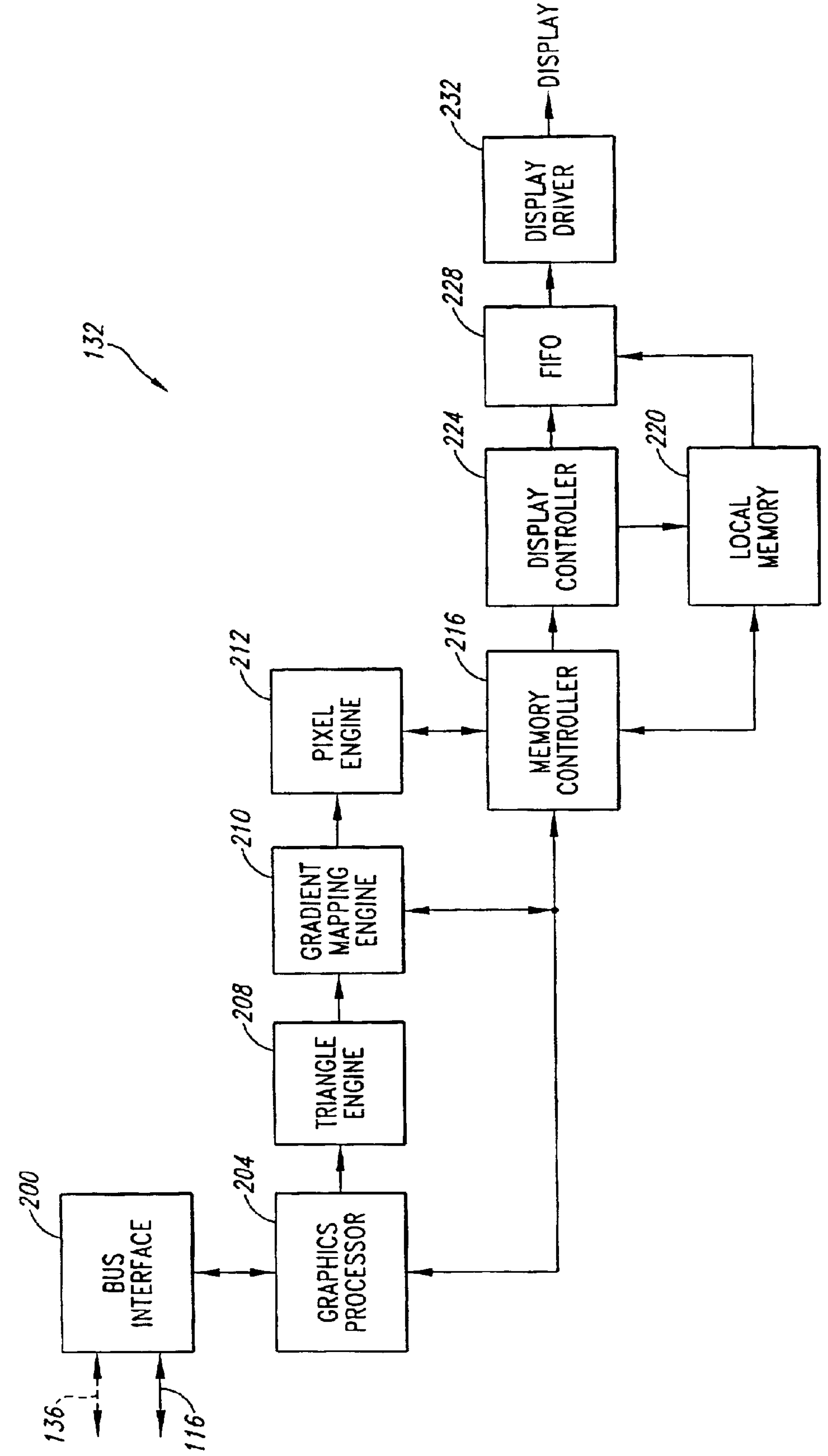
FIG. 2 is a block diagram of a graphics processing system in the computer system of FIG. 1.

FIG. 2 illustrates circuitry included within the graphics processing system 132 for performing various three-dimensional (3D) graphics functions. As shown in FIG. 2, a bus interface 200 couples the graphics processing system 132 to the expansion bus 116. In the case where the graphics processing system 132 is coupled to the processor 104 and the host memory 108 through the high speed data bus 136 and the memory/bus interface 112, the bus interface 200 will include a DMA controller (not shown) to coordinate transfer of data to and from the host memory 108 and the processor 104. A graphics processor 204 is coupled to the bus interface 200 and is designed to perform various graphics and video processing functions, such as, but not limited to, generating vertex data and performing vertex transformations for polygon graphics primitives that are used to model 3D objects. The graphics processor 204 is coupled to a triangle engine 208 that includes circuitry for performing various graphics functions, such as clipping, attribute transformations, rendering of graphics primitives, and generating texture coordinates for a texture map.

A gradient mapping engine 210 is coupled to the triangle engine 208 and receives set-up data for each pixel, such as pixel location, texture and vector data for the pixel, and gradient map coordinates. As will be explained in more detailed below, the gradient mapping engine 210 applies a gradient map to produce texels that are used to perturb a pixel's normal vector prior to providing the calculated values to a pixel engine for texture application. The pixel engine 212 is coupled to receive the gradient map data calculated by the gradient mapping engine 210, as well as graphics data from the triangle engine 208 that is passed through by the gradient mapping engine 210. The pixel engine 212 contains circuitry for performing various graphics functions, such as, but not limited to, texture application or mapping, bilinear filtering, fog, blending, and color space conversion.

A memory controller 216 coupled to the pixel engine 212 and the graphics processor 204 handles memory requests to and from a local memory 220. The local memory 220 stores graphics data, such as source pixel color values and destination pixel color values. A display controller 224 coupled to the local memory 220 and to a first-in first-out (FIFO) buffer 228 controls the transfer of destination color values to the FIFO 228. Destination color values stored in the FIFO 336 are provided to a display driver 232 that includes circuitry to provide digital color signals, or convert digital color signals to red, green, and blue analog color signals, to drive the display 140 (FIG. 1).

Figure 3:
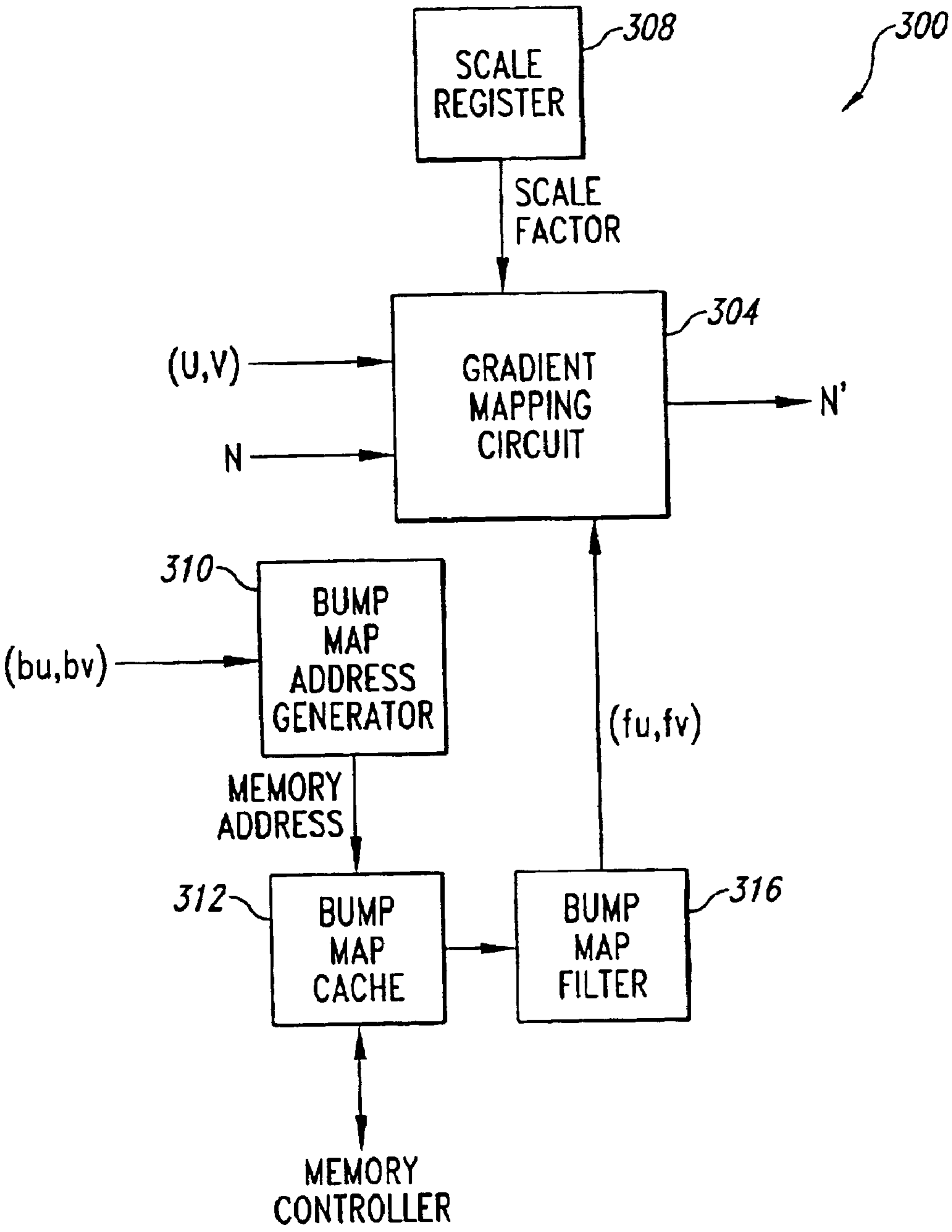
FIG. 3 is a block diagram of a gradient mapping engine according to an embodiment of the present invention.

FIG. 3 illustrates a gradient mapping engine 300 according to an embodiment of the present invention that may be substituted for the gradient mapping engine 210 shown in FIG. 2. A gradient mapping circuit 304 is provided by the triangle engine with the pixel coordinates (u, v) and the normal vector N. Bump map coordinates (bu, bv) of texels used in calculating the perturbed normal N' are provided to a bump map address generator 310. The bump map address generator 310 converts the bump map coordinates (bu, bv) into corresponding memory addresses at which the graphics data for the requested texels are stored and then provides the memory addresses to a bump map cache 312.

The bump map cache 312 receives the memory address for the texels having the bump map coordinates (bu, bv) and determines whether the graphics data is presently available in the cache. The bump map cache 312 is coupled to the memory controller 216 (FIG. 2) to request data directly from the memory controller 216 if it is determined that the requested graphics data is not available in the cache. A bump map filter 316 coupled to the bump map cache 312 provides the gradient mapping circuit 304 with bilinearly filtered values $f_u$ and $f_v$ obtained from the bump map by iterating the bump coordinates (bu, bv). The values $f_u$ and $f_v$ represent the derivatives, or the slope, at a particular pixel. A scale register 308 is also coupled to the gradient mapping circuit 304 to provide scale values to adjust the magnitude of the perturbed normal N'.

A detailed description of the scale register 308, the bump map address generator 310, the bump map cache 312 and the bump map filter 316 have been omitted because implementation of these elements are well known in the art, and a person of ordinary skill would be able to practice the present invention from the description provided herein. Moreover, it will be appreciated that these various elements, although illustrated in FIG. 3 as discrete functional blocks of the gradient mapping engine 300, may be integrated into one or more circuits that carry out the functionality described, and may be included in other functional blocks of the graphics processing system as previously described in FIGS. 1 and 2. For example, the bump map cache 312 and the bump map filter 316 may be included in the pixel engine 212 illustrated in FIG. 2.

In operation, the gradient mapping circuit 304 applies a gradient map to a surface of a polygon by perturbing the normal vector of the polygon surface according to an estimation of the equation utilized in conventional bump mapping applications. As mentioned previously, conventional bump mapping applications perturb the normal vector by adding to the normal vector a displacement, that is:

$$N'=N+D,$$

where N' is the perturbed normal, N is the interpolated normal, and D is the displacement, defined as:

$$D=f_u(P_v\times N)+f_v(P_u\times N).$$

$P_u$ and $P_v$ represent the tangent vectors along the u and v axes, respectively, and $f_u$ and $f_v$ are the partial derivatives of an image height field, f(u, v).

Rather than implementing the conventional equation, the gradient mapping circuit 304 implements an estimation according to the equation:

$$N'=N+D.$$

where N' is the perturbed normal and N is the interpolated normal. However, the displacement D is defined as:

$$D=(f_u{*}P_u{*}\text{scale}_u)+(f_v{*}P_v{*}\text{scale}_v)$$

where $P_u$ and $P_v$ represent the tangent vectors along the u and v axes, respectively, and $f_u$ and $f_v$, are bilinearly filtered values that represent the derivatives, or the slope, at a particular pixel having coordinates (u, v). The gradient mapping circuit 304 obtains the $f_u$ and $f_v$ values by iterating coordinates (bu, bv) of the bump map that are provided to it from the triangle engine 208 (FIG. 2). The $\text{scale}_u$ and $\text{scale}_v$ values are scalar values stored in the scale register 308 and provided to the gradient mapping circuit 304 for adjusting the magnitude of the perturbed normal N'. Both $\text{scale}_u$ and $\text{scale}_v$ may be the same value or two different values depending on the desired scaling effect on the perturbed normal N'. The perturbed normal N' may be normalized by the gradient mapping circuit 304 before providing it to the pixel engine 212 (FIG. 2) for use in calculating reflection and lighting values for the pixel being rendered. These calculated values are in turn used to determine the color values of the pixels being rendered. The resulting graphics image displayed will have realistic surface detail due to the use of the perturbed normal in the color value calculation, however, calculation of the displacement D and the perturbed normal N' by the gradient mapping circuit 304 does not require the complex circuitry required for calculating cross products of vectors.

It will be appreciated that the vector calculations performed by the gradient mapping circuit 304 may be accomplished by performing the calculations on the component vectors. That is, the gradient mapping circuit 304 will perform three vector calculations for each axes in a three dimensional space to resolve the perturbed normal N'. For example, the perturbed normal is determined, as discussed previously, by the gradient mapping circuit by:

$$N'=N+(f_u{*}P_u{*}\text{scale}_u)+(f_v{*}P_v{*}\text{scale}_v).$$

However, the gradient mapping circuit 304 will resolve the perturbed normal N' through its component vectors, that is:

$$N'.x=N.x+(f_u{*}P_u.x{*}\text{scale}_u)+(f_v{*}P_v.x{*}\text{scale}_v);$$

$$N'.y=N.y+(f_u{*}P_u.y{*}\text{scale}_u)+(f_v{*}P_v.y{*}\text{scale}_v);\ \text{and}$$

$$N'.z=N.z+(f_u.{*}P_u.z{*}\text{scale}_u)+(f_v{*}P_v.z{*}\text{scale}_v).$$

The components of the perturbed normal N' are then provided to the pixel engine 212 (FIG. 2) for application of the gradient map to the pixel being rendered.

As shown above, the resulting displacement calculation uses the surface tangent vector instead of interpolating the tangent vectors across vertices of a triangle polygon. The estimation of the conventional equation provides good results since the tangent vectors change quickly only at surfaces of high curvature. However, these areas are already finely tessellated.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. In a graphics processing system, a method of altering color values of a pixel along a surface function having an interpolated normal vector, comprising:

adding a displacement vector to the interpolated normal vector to produce a perturbed normal vector, the displacement vector calculated from the equation:

$$D=(fu{*}Pu{*}\ \text{scaleu})+(fv{*}Pv{*}\ \text{scalev}),$$

where D is the displacement vector, Pu and Pv are perpendicular vectors tangent to the surface function at the pixel, fu and fv are displacement values along Pu and Pv, respectively, and scaleu and scalev are scaling values;

iterating bump map coordinates (bu, bv) of texels to obtain the displacement values fu and fv, respectively;

retrieving the scaling values scaleu and scalev from a scale register; and generating color values for the pixel based on the perturbed normal vector instead of the interpolated normal vector.

2. The method of claim 1 wherein Pu, Pv, the perturbed normal vector, and the displacement vector comprise three coordinate vectors.

3. The method of claim 1, further comprising normalizing the perturbed normal vector.

4. The method of claim 1 wherein fu and fv represent partial derivatives of a function defining a texture applied to the surface.

5. The method of claim 4 wherein fu and fv comprise bilinearly filtered values.

6. In a graphics processing system, a method for altering color values of a pixel having a normal vector normal to a surface in which the pixel is located, the method comprising iterating bump map coordinates (bu, bv) of texels to obtain first and second displacement values, respectively, retrieving first and second scale factors from a scale register, and calculating the color values for the pixel based on a perturbed normal vector having a displacement from the interpolated normal vector, the displacement equal to:

a first vector tangent to the surface at the location of the pixel scaled by the first scale factor and the first displacement value, and a second vector tangent to the surface at the location of the pixel and scaled by the second scale factor and the second displacement value, the second vector perpendicular to the first vector.

7. The method of claim 6, further comprising normalizing the perturbed normal vector.

8. The method of claim 6 wherein the first and second displacement values comprise values representative of partial derivatives for a first and second variable, respectively, of a function defining a texture applied to the surface.

9. The method of claim 8 wherein the first and second displacement values comprise bilinearly interpolated values.

10. The method of claim 6 wherein the first and second scale factors comprise unequal values.

11. A method for providing surface texture in a graphics image, comprising:

determining a normal vector for a pixel having a location along a surface;

iterating bump map coordinates (bu, bv) of texels to obtain first and second displacement components, respectively;

retrieving first and second scale factors from a scale register;

adding a displacement vector to the normal vector to produce a perturbed normal vector, the displacement vector calculated from the sum of:

a first vector tangent to the surface at the location of the pixel scaled by the first scale factor and the first displacement component, and a second vector perpendicular to the first vector and tangent to the surface at the location of the pixel and scaled by the second scale factor and the second displacement component; and calculating color values for the pixel based on the perturbed normal vector instead of the normal vector.

12. The method of claim 11 wherein the surface corresponds to a polygon having vertices, and determining a normal vector for the pixel comprises interpolating the normal vector from first and second normal vectors normal to the surface at locations corresponding to first and second vertices of the polygon.

13. The method of claim 11, further comprising normalizing the perturbed normal vector.

14. The method of claim 11 wherein the first and second displacement components comprise values representative of partial derivatives for a first and second variable, respectively, of a function defining a texture applied to the surface.

15. The method of claim 14 wherein the first and second displacement components comprise bilinearly interpolated values.

16. The method of claim 11 wherein the first and second scale factors comprise unequal values.

17. A computer graphics processing system for calculating color values of pixel having a location along a surface, comprising:

a bump map filter having inputs at which bump map coordinates (bu, bv) are received, the bump map filter configured to iterate the bump map coordinates to generate first and second displacement components;

a scale register storing first and second scale factors;

a gradient mapping circuit coupled to the bump map filter and the scale register, the gradient mapping circuit configured to calculate for the pixel a perturbed normal vector displaced from a normal vector normal to the surface at the location of the pixel by a displacement vector, the displacement vector equal to the sum of:

a first vector tangent to the surface at the pixel scaled by the first scale factor and the first displacement component, and a second vector tangent to the surface at the pixel and scaled by the second scale factor and the second displacement component, the second vector perpendicular to the first vector.

18. The computer graphics processing system of claim 17 wherein the gradient mapping circuit normalizes the perturbed normal vector.

19. The computer graphics processing system of claim 17 wherein the first and second displacement values comprise values representative of partial derivatives for a first and second variable, respectively, of a function defining a texture applied to the surface.

20. The computer graphics processing system of claim 19 wherein the first and second displacement values comprise bilinearly interpolated values.

21. The computer graphics processing system of claim 17 wherein the first and second scale factors comprise unequal values.

22. A computer graphics processing system for calculating color values of pixels representing a surface, comprising bump map filter having inputs at which bump map coordinates (bu, bv) are received, the bump map filter configured to iterate the bump map coordinates to generate first and second displacement components, a scale register storing first and second scale factors, and a gradient mapping circuit to calculate for each pixel a value representative of a displacement vector having first and second perpendicular components, the first component equal to the product of a first vector tangent to the surface at the pixel, the first scale factor, and the first displacement component along the first vector, and the second component equal to the product of a second vector tangent to the surface at the pixel, the second scale factor, and the second displacement component along the second vector.

23. A computer system, comprising:

a system processor;

a system bus coupled to the system processor;

a system memory coupled to the system bus;

a display; and a graphics processing system coupled to the system bus and the display for calculating color values of a pixel having a location along a surface and providing graphics data to the display, the graphics processing system comprising:

a bump map filter having inputs at which bump map coordinates (bu, bv) are received, the bump map filter configured to iterate the bump map coordinates to generate first and second displacement components;

a scale register storing first and second scale factors;

a gradient mapping circuit coupled to the bump map filter and the scale register, the gradient mapping circuit configured to calculate for the pixel a perturbed normal vector displaced from a normal vector normal to the surface at the location of the pixel by a displacement vector, the displacement vector equal to the sum of:

a first vector tangent to the surface at the pixel scaled by the first scale factor and the first displacement component, and a second vector tangent to the surface at the pixel and scaled by the second scale factor and the second displacement component, the second vector perpendicular to the first vector.

24. The computer system of claim 23 wherein the gradient mapping circuit normalizes the perturbed normal vector.

25. The computer system of claim 23 wherein the first and second displacement values comprise values representative of partial derivatives for a first and second variable, respectively, of a function defining a texture applied to the surface.

26. The computer system of claim 25 wherein the first and second displacement values comprise bilinearly interpolated values.

27. The computer system of claim 23 wherein the first and second scale factors comprise unequal values.

* * * * *

UNITED STATES PATENT AND TRADEMARK OFFICE

CERTIFICATE OF CORRECTION

PATENT NO. : 6,850,244 B2 
DATED : February 1, 2005
INVENTOR(S) : Aaftab Munshi and Colin Sharp It is certified that error appears in the above-identified patent and that said Letters Patent is hereby corrected as shown below:

Title page,
Item [73], Assignee, reads "Micron Techology, Inc.," should read -- Micron Technology, Inc., --.

Column 2,
Line 42, reads "values that may be unequal that are used" should read -- values that are used --.

Column 4,
Line 7, reads "detailed below," should read -- detail below, --.

Column 6,
Line 32, reads "D = (fu * Pu * scaleu) + (fv * Pv * scalev)," should read
-- D = (fu * Pu * $scale_u$) + (fv * Pv * $scale_v$), --.
Line 41, reads "values scaleu and scalev" should read -- values $scale_u$ and $scale_v$ --.

Signed and Sealed this

Sixteenth Day of August, 2005

JON W. DUDAS
*Director of the United States Patent and Trademark Office*